United States Patent
Giuliano

(10) Patent No.: US 11,187,353 B1
(45) Date of Patent: Nov. 30, 2021

(54) STRUT CHANNEL MOUNTING CLIP

(71) Applicant: Vibration Mountings & Controls, Inc., Bloomingdale, NJ (US)

(72) Inventor: John P. Giuliano, Ledgewood, NJ (US)

(73) Assignee: VIBRATION MOUNTINGS & CONTROLS, INC., Bloomingdale, NJ (US)

( * ) Notice: Subject to any disclaimer, the term of this patent is extended or adjusted under 35 U.S.C. 154(b) by 0 days.

(21) Appl. No.: 17/244,286

(22) Filed: Apr. 29, 2021

(51) Int. Cl.
*F16L 3/10* (2006.01)

(52) U.S. Cl.
CPC .................... *F16L 3/1058* (2013.01)

(58) Field of Classification Search
CPC ... F16L 3/1058; F16L 3/24; F16L 3/12; F16L 55/0335
USPC ......................................................... 248/74.1
See application file for complete search history.

(56) References Cited

U.S. PATENT DOCUMENTS

| | | | | |
|---|---|---|---|---|
| 3,522,921 A | * | 8/1970 | Havener | F16L 3/243 248/62 |
| 3,532,311 A | * | 10/1970 | Newell | F16L 3/227 248/62 |
| 4,708,554 A | * | 11/1987 | Howard | E04C 3/06 411/84 |
| 6,290,426 B1 | | 9/2001 | Van Gijsel et al. | |
| 6,454,232 B1 | | 9/2002 | Roth | |
| 6,991,198 B1 | * | 1/2006 | Roth | F16B 2/065 248/58 |
| 7,992,829 B1 | * | 8/2011 | Baker | F16L 3/243 248/73 |
| 8,322,661 B2 | * | 12/2012 | Oh | F16L 3/14 248/62 |
| 9,347,589 B1 | * | 5/2016 | Oh | F16L 3/10 |
| 9,441,656 B2 | * | 9/2016 | Duggan | F16L 3/2431 |
| 9,683,590 B2 | * | 6/2017 | Zhang | F16B 7/0473 |
| 2003/0089828 A1 | * | 5/2003 | Korczak | F16B 37/02 248/68.1 |
| 2012/0160983 A1 | | 6/2012 | Roth | |
| 2016/0115981 A1 | * | 4/2016 | Duggan | F16B 2/14 248/65 |
| 2020/0027797 A1 | | 1/2020 | Guo | |
| 2020/0109800 A1 | * | 4/2020 | Bell | F16L 3/221 |
| 2020/0277976 A1 | * | 9/2020 | Duggan | F16L 3/2431 |

* cited by examiner

*Primary Examiner* — Muhammad Ijaz
(74) *Attorney, Agent, or Firm* — Ladas & Parry LLP

(57) ABSTRACT

A clip for attachment of a walled strut channel around a support rod to provide increased stiffness for the support rod by insertion of the clip within the strut channel to provide engagement of the support rod with an interior surface of the strut channel has a pair of flexible arms spaced apart to provide biased contact against opposed walls of the strut channel upon insertion. The arms terminate at their distal ends in a pair of insertion handles with the arms being joined together by a generally u-shaped central clip portion having side walls that at least partially conform to a circumference of the support rod. The central clip portion biases the support rod against the strut channel's interior surface, maintaining the support rod in a fixed position against the strut channel.

5 Claims, 4 Drawing Sheets

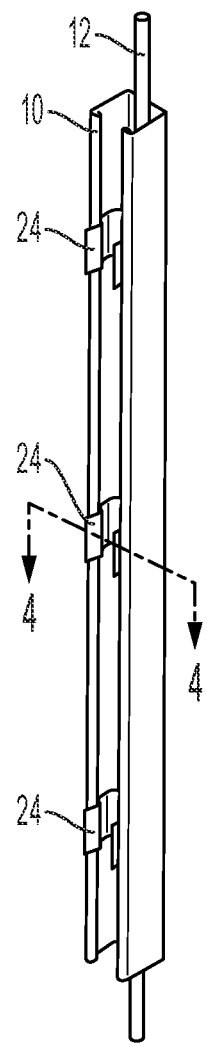
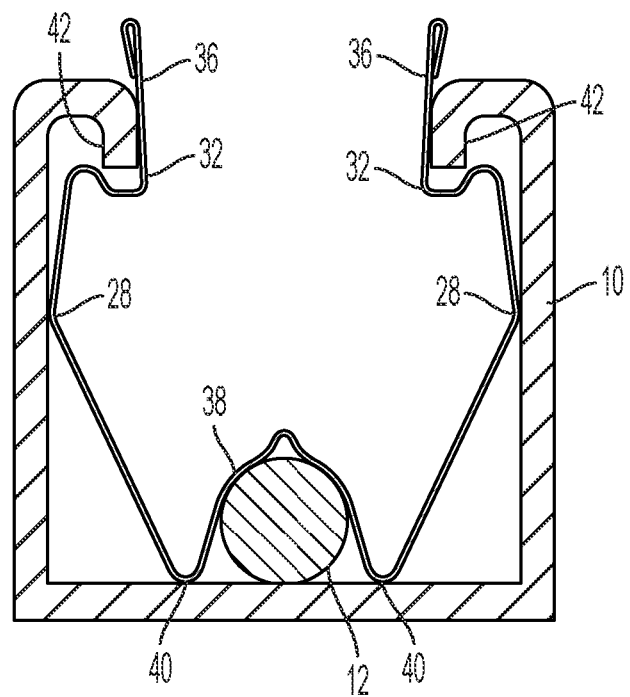
FIG. 3
FIG. 4

STRUT CHANNEL MOUNTING CLIP

The present invention relates to the mechanical arts, and in particular to a new and improved clip device for the strengthening of hanger rods.

BACKGROUND OF THE INVENTION

Suspended equipment, such as piping, sprinkler systems, and utility lines, are often suspended from building ceilings. Rod, and particularly threaded rod, is the primary support member. The rods are attached either directly to the component being hung and supported or attached to the component by use of a mounting device, such as a clevis hanger or trapeze system. The support or hanger rods are typically designed and sized for tension loads due to gravity and can vary in lengths form a few inches to several feet.

In applications in which such rods may be subject to additional loading, such as due to seismic conditions, building codes require that the rods be capable of withstanding both tension and compression loading, and often the compression loading that may be experienced in such conditions can far exceed the capability of a rod to handle such loads without bucking and permanently deforming. The longer the support rod the less resistance to buckling under compression load. With typical rod dimeters less than 1 inch, such rods often exceed general code requirements for a maximum slenderness ratio kL/r, where K is the effective length constant for the material; L is rod length; and r is rod radius.

In order to prevent such long rods from buckling, methods of "rod stiffening" have been adopted. In general, they comprise the fastening of a stiffening member along a portion of the rod length. The coupling of such an auxiliary member shortens the effective length of the unbraced portion, lowering the slenderness ratio kL/r and increasing the maximum compression load before buckling. The supported stiffening member is not intended to assist in carrying a compression load; it is rather intended to stiffen the rod and prevent its lateral displacement and buckling.

Coupling of the stiffener element, which is typically a standard industry strut channel or angle element, is typically accomplished by the bolting of the stiffening element to the support rod, requiring several pieces of hardware in addition to requiring the use of a tool to position, bolt or screw the hardware and thus the stiffening element into place. Installation can require several labor steps, extending installation time and cost, and may require the use of specialized tools. Alternatively, there have been attempts to couple the strut channel by use of a lever-activated clamp unit.

Accordingly, there is a need in the industry for a device that can be used to mount a stiffener element to a hanger or support rod with a one-piece construction, which can be installed without the need for tools, which is economical and is clearly visible for post-installation inspection while being unobtrusive and holding the strut channel securely against the rod.

BRIEF DESCRIPTION OF THE INVENTION

The foregoing and other needs are met by a fastener of the present invention, which comprises a one-piece clip formed of metal of appropriate thickness, formed into a generally U-shaped element. The arms of the clip are adapted to engage with the inner web of the strut channel member, while the central portion of the clip is contoured to surround and securely engage with the support rod, preventing it from slipping with respect to the clamp and engaged strut channel member. The clip is flexible enough to allow the arms to pivot towards each other during installation, yet rigid enough to securely grip the support rod and hold the strut channel member in place.

BRIEF DESCRIPTION OF THE DRAWINGS

A full understanding of the invention and its mode of operation will be accomplished upon consideration of the following detailed description thereof in association with the annexed drawings, wherein:

FIG. 3 is a perspective view of a series of the clips of FIG. 2 mounting a strut channel to a support rod;

FIG. 4 is a cross-sectional view taken along line 4-4 in FIG. 3; and

DETAILED DESCRIPTION OF THE INVENTION

Figure 1:
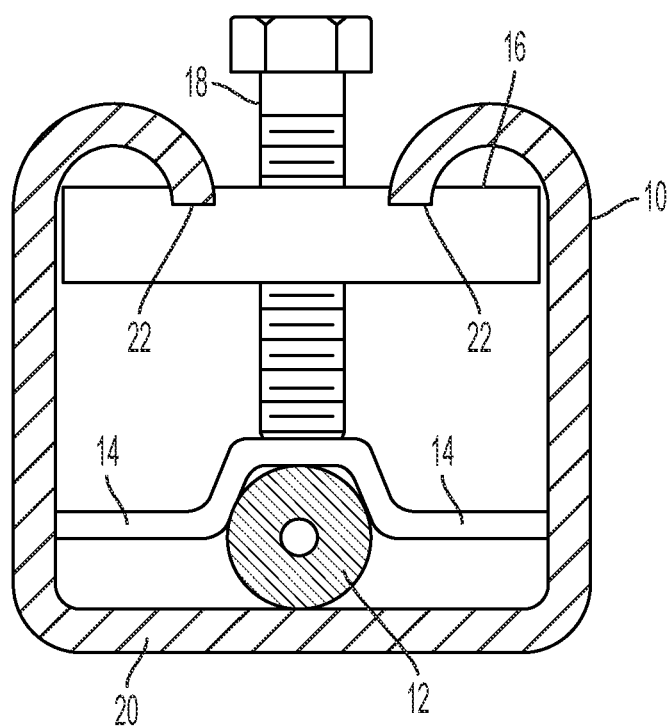
FIG. 1 is a cross-sectional view of a conventional support rod clamping system in place on a support rod.

As illustrated in FIG. 1, a representative conventional clamping system of the prior art for affixing a strut channel element 10 to a support rod 12 comprises a cradle element 14, which presses upon the rod 12. A channel nut 16 has a threaded thrubore to accept bolt 18. Tightening the bolt tensions the cradle element 14 against the rod 12, pressing the rod against the web 20 of the strut channel, while the channel nut is retained within the strut channel element 10 by the inwardly facing channel element flanges 22. A wrench is required to tighten the bolt, and the multiple pieces require some degree of installer dexterity to have them properly align for installation and tightening. The installed clamp, if not properly tightened, may loosen over time, thus failing to provide the needed support for the rod.

Figure 2:
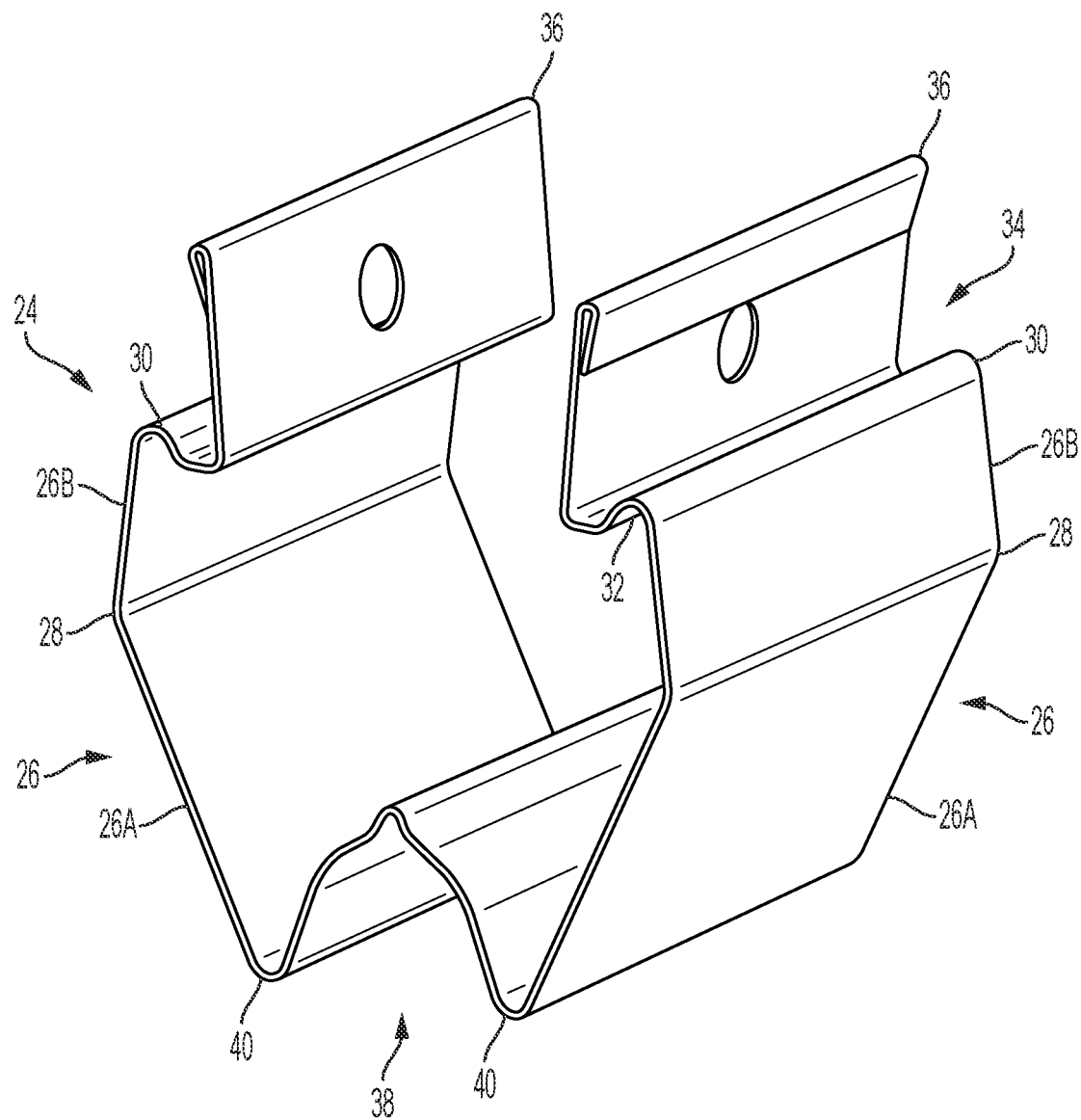
FIG. 2 is a perspective view of a clip unit of the present invention.

The present invention, as illustrated in FIG. 2, is of one-piece construction and avoids the need for tools for installation, providing simple and easy installation. As illustrated, clip 24 comprises a pair arms 26 extending upward and outward from central clamp section 38.

Each arm 26 includes an outwardly-directed lower portion 26A and inwardly-directed adjacent upper portion 26B with crease line 28 between the two portions representing the maximum arm-to-arm spacing. The portions 26B each terminate at their upper ends with an S-curve portion 30, forming a downwardly directed channel 32 and an upward facing channel 34 with an upwardly extending sidewall 36, further serving as a handgrip location and an insertion handle for manual installation of the clamp. The terminating ends of the sidewalls 36 may be folded over to avoid an exposed sharp end of the handgrip locations.

The arms 26 are joined together at their lower ends through inverted V central clip section 38, with the lower ends of the arms transitioning into the inverted V central clip section along transition lines 40. The walls of the inverted V central clip portion, which may form an included angle of 40 degrees, are sized to embrace the support rod 12 with which the clip is to be used. At least a portion of the walls are preferably contoured to match the circumference of the support rod to be engaged by the clip.

As illustrated herein, the clip may be fabricated from 0.012 (0.3 mm) SS301 steel or equivalent, dimensioned for use with a standard strut channel, such as a Series P1000 strut channel manufactured by the Unistrut division of Atkore Inc. in connection with a support rod 12 of between 0.375 and 0.625 inch diameter, by varying the inverted V central clip portion's geometry. One skilled in the art will recognize that the dimensions of the clip can be varied in accordance with the strut channel element and support rod with which the clip is to be used. The choice of material for the clip's construction is such that the arms 26 can be flexed with respect to the central clamp section 38, allowing the clamp to be installed on the strut channel element, as explained and illustrated herein.

With respect to use in connection with a standard strut channel and support rod as identified above, the central rod-embracing inverted V clip section 38 may have an entrance spacing (between the transition lines 40) on the order of 0.64 inches. At their widest separation points, crease lines 28, the arms are about 1.47 inches apart. In the uninstalled condition, the sidewalls 36 may be at an outwardly-directed angle of about 5 degrees from the vertical. The overall height of the clip may be 1.70 inches, with a front to back length of 1.5 inches. The clip may be epoxy coated or otherwise treated to improve durability.

Figure 5:
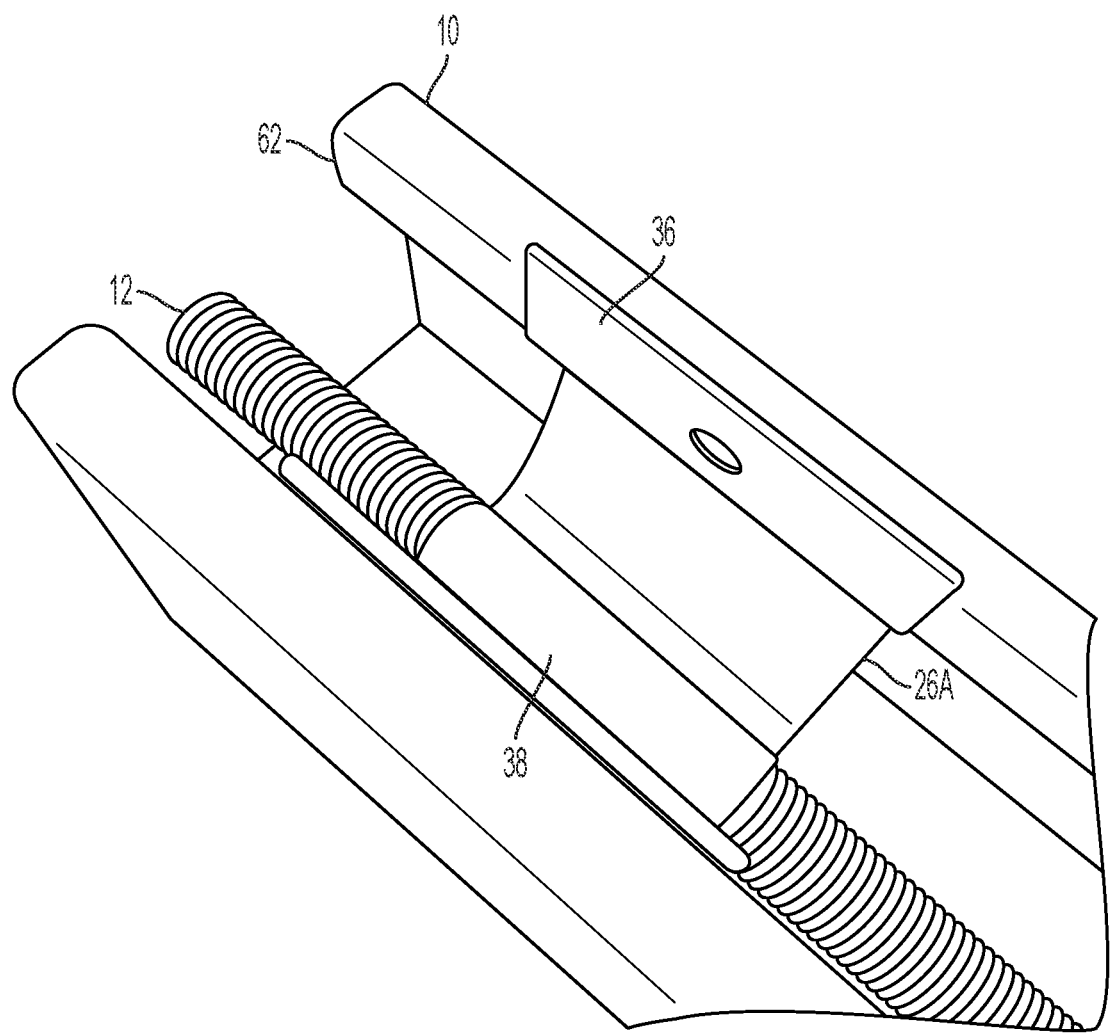
FIG. 5 is a detail perspective view of a mounted clip.

FIGS. 3, 4 and 5 illustrate a clip 24 installed on a strut channel 10 to retain support rod 12 in contact with the strut channel. As best seen in FIGS. 4 and 5, the support rod 12 is cradled in in the inverted V central clip section 38, which is dimensioned such that, with the sides of the section engaging the support rod, the support rod is pressed against the base of the strut channel 10 with the transition points 40 between the clip arms and inverted V central section 38 in contact with the web of the strut channel, further holding the rod in place and preventing lateral movement with respect to the strut channel. The arms 26 are flexed inwardly, the crease lines 28 engaging the sidewalls of the strut channel, while the channels 32 accommodate the flanges 42 of the strut channel, the sidewalls 36 bearing against the exterior sides of the flanges. The pressure of the clip portions in contact with the strut channel 10 and support rod 12 are sufficient to securely maintain the support rod in position with respect to the strut channel.

As illustrated in FIG. 3, with a plurality of clips installed along a length of strut channel, the captured support rod 12 is incapable of lateral movement or flex along the strut channel length. This effectively shortens the (free) length of the support rod, lowering the rod's effective slenderness ratio and allowing for greater loading of the rod.

Installation of the clip may be performed by positioning the strut channel along the rod 12 with the rod generally centered against base of the strut channel. Holding the sidewall handgrips 36 and squeezing them together to bring the arms towards each other, the clip is inserted into the strut channel until the transition lines 40 are in contact with the base of the strut channel, capturing the rod in the inverted V central section 38. Pressure on the handgrips 36 is then released, the arms springing outward such that the crease line 28 engage the sidewalls of the strut channel and the sidewall handgrips 36 are in contact with the strut channel flanges 42. The installation procedure is then repeated with the desired additional number of clips along the length of the strut channel, as shown in FIG. 3. The rod 12 is thus rigidly supported against the strut channel and installation is complete.

One skilled in the art may recognize that various modifications can be made in the construction as described and illustrated herein without departure from the scope of invention, and it is intended that the disclosure as presented herein be illustrative and not limiting.

I claim:

1. A clip for attachment of a walled strut channel around a support rod to provide increased stiffness for the support rod by insertion of the clip within the strut channel to provide engagement of the support rod with an interior surface of the strut channel, comprising:
   a pair of flexible arms spaced apart to provide biased contact against opposed walls of the strut channel upon insertion;
   the arms terminating at distal ends in a pair of insertion handles, the arms being joined together by a generally u-shaped central clip portion having side walls that at least partially conform to a circumference of the support rod, the central clip portion being adapted to bias the support rod against the interior surface of the strut channel, the side walls being joined to the central clip portion along a pair of transition lines such that the transition lines bear against the interior surface of the strut channel with the support rod being biased against the interior surface;
   whereby the support rod is maintained in a fixed position against the strut channel by an action of the clip.

2. The clip of claim 1 wherein each arm is provided with a crease line to provide a location of biased contact with the strut channel.

3. The clip of claim 2 wherein the crease line extends laterally to divide the arm into upper and lower portions.

4. The clip of claim 3 wherein the upper arm portion includes a laterally extending s-curve portion dividing the upper arm portion into a portion extending to the crease line and a portion defining an insertion handle.

5. The clip of claim 4 wherein the s-curve portion forms a channel adapted to engage a terminating flange of the strut channel.

* * * * *